May 15, 1923.    W. C. MOORS    1,455,144
WEED EXTRACTOR
Filed May 11, 1922
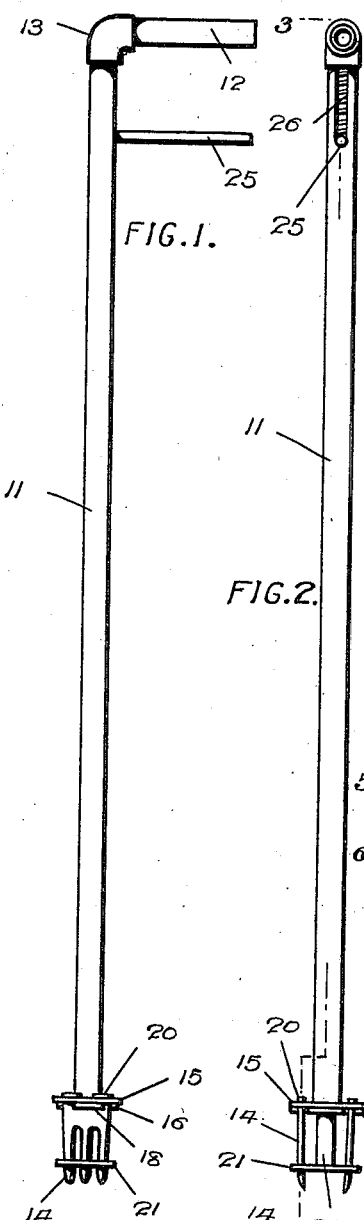
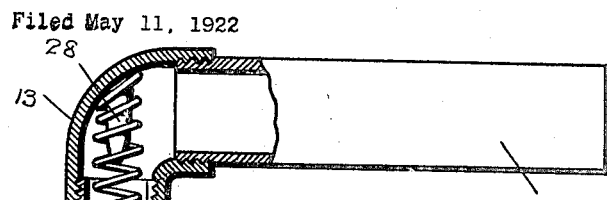
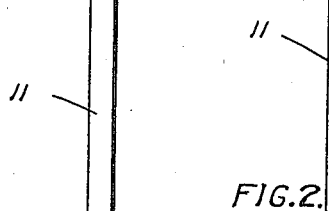
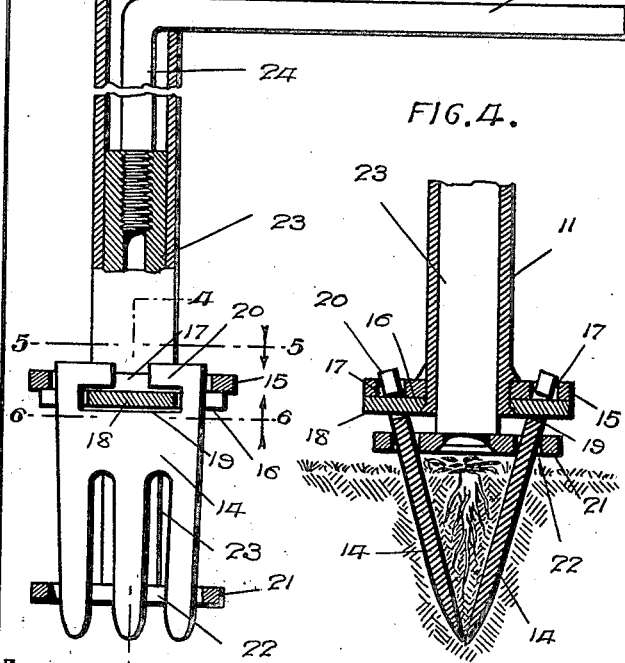
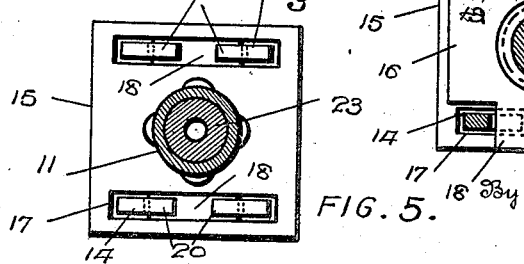
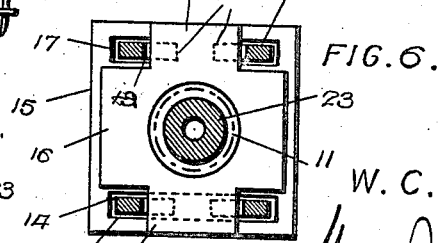
Inventor:
W. C. MOORS,
By Monroe E. Miller
Attorney.

Patented May 15, 1923.

1,455,144

UNITED STATES PATENT OFFICE.

WALTER C. MOORS, OF OWENSBORO, KENTUCKY.

WEED EXTRACTOR.

Application filed May 11, 1922. Serial No. 560,052.

*To all whom it may concern:*

Be it known that I, WALTER C. MOORS, a citizen of the United States, residing at Owensboro, in the county of Daviess and State of Kentucky, have invented certain new and useful Improvements in Weed Extractors, of which the following is a specification, reference being had therein to the accompanying drawing.

The present invention relates to devices for extracting or pulling weeds from the ground, and aims to provide a novel and improved device of that kind which can be conveniently manipulated for effectively catching hold of and pulling the weeds from the soil.

Another object is the provision of such a device comprising a novel construction and assemblage of the component elements, to enhance the utility and efficiency of the implement, and to render it substantial and durable.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the device.

Fig. 2 is another side elevation looking at right angles to the line of view in Fig. 1.

Fig. 3 is an enlarged section on the line 3—3 of Fig. 2, portions being broken away.

Fig. 4 is a section on the line 4—4 of Fig. 3 showing the jaws closed.

Figs. 5 and 6 are cross sections on the respective lines 5—5 and 6—6 of Fig. 3.

A tubular stem or shank 11 of suitable length has a laterally extending handle 12 at its upper end connected to the upper end of said shank by an elbow 13 for conveniently manipulating the implement. A pair of jaws 14 is carried by the lower end portion of said shank, and, as shown, said jaws are in the form of forks or claws having prongs to enter the ground and to firmly hold a weed and its roots between the jaws when they are closed on the weed, as seen in Fig. 4. Said jaws 14 are hingedly connected to the lower end of the shank in a substantial manner, as will presently appear.

A pair of plates 15 and 16, of suitable thickness, are fitted and secured on the lower terminal of the shank, and are superposed. The upper plate 15 has a pair of parallel slots 17 at the opposite sides of the shank, and the plate 16 has tongues or portions 18 extending transversely across said slots. The upper end portions of the jaws 14 are fitted on the tongues 18 within the slots 17, to provide the hinged connections without using hinge pins, and providing a strong construction which will withstand wear and tear by the strains to which the device is subjected and rough treatment. The upper end portions of the jaws have the slots 19 receiving the tongues 18, and said jaws are thus disposed loosely on the tongues to oscillate toward and away from one another, and said slots 19 are formed to provide the hooked-shaped lugs 20 engaging across the edges and over the upper surfaces of the tongues 18, within the slots 17, thereby retaining the jaws in place on said tongues. The lugs 20 being located within the slots 17, prevent the jaws from sliding off of the tongues, thereby holding the parts assembled. The jaws 14 are slipped on the tongues 18, before the plates 15 and 16 are brought together and secured on the shank.

The operating means for moving the jaws toward and away from one another to closed and open positions, comprise a plate 21 disposed below and parallel with the plates 15 and 16, and having the parallel slots 22 at opposite sides of the axis of the shank 11 through which the jaws 14 extend. The slots 22 are located closer together than the slots 17, so that when the plate 21 is raised, the jaws are swung toward one another, as seen in Fig. 4, whereas when the plate 21 is moved away from the end of the shank, the jaws 14 are separated, as seen in Fig. 2. The plate 21 is secured centrally to the outer end of a plunger 23 slidable in the lower end portion of the shank 11, and an actuating rod 24 extends longitudinally within the shank and has its lower end secured to the plunger 23, such as by screw-threading the lower end of the rod in said plunger. The rod 24 has its upper terminal bent to one side at an angle, to extend laterally in the same direction with the handle 12 parallel therewith and below said handle, to provide a handle portion 25. The upper end portion of the shank 11 has a longitudinal slot 26 through which the handle portion 25 projects, and the rod 24 is normally slid downwardly, to open the jaws 14, by means of a coiled spring 27 located within the upper end portion of the shank and confined between the upper end of the rod 24 and the elbow 13. Said elbow has a depending finger 28 on which the upper end of the spring is fitted, for retaining the spring in place.

In using the device, the jaws 14 are normally in open position, and the handle 12 is grasped by one hand. The jaws may then be forced or thrust into the ground at the opposite sides of a weed, and, at the same time, the handle portion 25 can be drawn toward the handle 12, by the fingers of the hand grasping said handle, thereby raising the rod 24 and plunger 23, and causing the plate 21 to swing the jaws 14 together, as seen in Fig. 4. Then, by giving the shank a twisting or turning movement, the weed is loosened from the ground, and can be pulled or extracted from the ground by keeping the jaws in closed position. By letting go of the handle portion 25, the spring 27 slides the rod 24 downwardly in the shank, to open the jaws, thereby letting the weed drop out. The implement can also be used by placing the lower end thereof over the weed and pressing down with the hand grasping the handle 12, or pressing on the plate 16 by the foot, thereby forcing the jaws or prongs into the ground at the opposite sides of the weed and its root. The plate 21 in coming to rest on the ground over the weed, will be stopped in its downward movement, and the jaws or prongs in sliding through the plate 21 will swing them toward one another to close the jaws on the roots, as seen in Fig. 4. Then, by grasping the handle portion 25 and handle 12, and pulling the implement from the ground, twisting same in doing so if desired, the weed is extracted, and by releasing the handle portion 25, the spring 27 in expanding will kick or eject the weed from between the jaws, and the plate 21 will also clean any dirt from the jaws or prongs.

Having thus described the invention, what is claimed as new is:—

1. An extractor comprising a shank, a pair of plates secured to the shank and disposed together, jaws having hinge portions, said plates having portions for holding said hinge portions between them for hingedly connecting the jaws with said plates and shank, and operating means connected to said jaws.

2. An extractor comprising a shank, a pair of plates secured to the shank and disposed together, jaws having hinge portions, one of said plates having portions receiving said hinge portions and the other plate holding said hinge portions in engagement with said last named portions, and operating means connected to the jaws.

3. An extractor comprising a shank, a pair of plates secured to the shank, jaws having lugs engaging one of said plates to hingedly connect the jaws therewith, the other plate engaging said jaws to hold said lugs in engagement with the first named plate, and operating means connected to the jaws.

4. A weed extractor comprising a shank, a pair of plates secured to the shank, jaws, one of said plates having portions on which the jaws are fitted for swinging movement, and the other plate having slots receiving the jaws for retaining same on said portions, and operating means connected to the jaws.

5. A weed extractor comprising a shank, a pair of plates secured to the shank, one plate having slots, the other plate having portions extending across said slots, jaws fitted on said portions for swinging movement and disposed in said slots to be retained on said portions, and operating means connected to the jaws.

6. In a device of the character described, a shank, a pair of plates secured to the shank, one plate having a slot, the other plate having a portion extending across said slot, a jaw fitted on said portion for swinging movement and disposed in said slot to be retained on said portion, and operating means connected to said jaw.

In testimony whereof I hereunto affix my signature.

WALTER C. MOORS.